United States Patent
Bacos et al.

(10) Patent No.: US 7,608,301 B2
(45) Date of Patent: Oct. 27, 2009

(54) PROCESS FOR FORMING A PROTECTIVE COATING CONTAINING ALUMINIUM AND ZIRCONIUM ON A METAL

(75) Inventors: Marie-Pierre Bacos, Antony (FR); Pierre Josso, Issy les Moulineaux (FR); Serge Naveos, Chatenay-Malabry (FR)

(73) Assignees: ONERA (Office National d'Etudes et de Recherches Aerospatiales), Chatillon (FR); SNECMA Moteurs, Paris (FR)

(*) Notice: Subject to any disclaimer, the term of this patent is extended or adjusted under 35 U.S.C. 154(b) by 601 days.

(21) Appl. No.: 10/815,526

(22) Filed: Mar. 31, 2004

(65) Prior Publication Data
US 2004/0194858 A1    Oct. 7, 2004

(30) Foreign Application Priority Data
Apr. 2, 2003    (FR) .................................. 03 04104

(51) Int. Cl.
C23C 16/00 (2006.01)
C23C 14/00 (2006.01)
C23C 16/06 (2006.01)
C23C 16/08 (2006.01)
C23C 16/22 (2006.01)

(52) U.S. Cl. ............... 427/248.1; 427/250; 427/252; 427/254; 427/255.23; 427/255.26; 427/255.28; 427/255.32; 427/255.34; 427/255.36; 427/255.39; 427/255.395

(58) Field of Classification Search ................. 427/253
See application file for complete search history.

(56) References Cited

U.S. PATENT DOCUMENTS

| 3,257,230 | A | * | 6/1966 | Wachtell et al. ............. 428/652 |
| 3,486,927 | A |   | 12/1969 | Gauje |
| 5,068,127 | A | * | 11/1991 | Fournes et al. .............. 427/237 |
| 5,455,071 | A |   | 10/1995 | Pillhoefer et al. |
| 6,273,678 | B1 | * | 8/2001 | Darolia ........................ 415/200 |
| 6,291,014 | B1 |   | 9/2001 | Warnes et al. |
| 6,527,924 | B1 | * | 3/2003 | Andolfatto et al. ..... 204/290.01 |

FOREIGN PATENT DOCUMENTS

EP    0 821 078 A1    1/1998

(Continued)

OTHER PUBLICATIONS

Corresponding French Application Preliminary Search Report, dated Nov. 13, 2003.

Primary Examiner—Timothy H Meeks
Assistant Examiner—Michael G Miller
(74) Attorney, Agent, or Firm—Christie, Parker & Hale LLP

(57) ABSTRACT

This relates to an improvement to the process of aluminization or activated cementation in which a donor cement containing the aluminium is attacked at high temperature and in a neutral or reducing atmosphere by a gaseous ammonium halide to form a gaseous aluminium halide which decomposes on contact with a nickel-based substrate depositing aluminium metal thereon.

According to the invention the aluminium halide is at least partly replaced by a zirconium halide leading to the inclusion of zirconium in the deposit.

Improvement in the protection of the hot parts of aircraft engines made of nickel-based superalloy.

No figure is to be published.

21 Claims, 1 Drawing Sheet

FOREIGN PATENT DOCUMENTS

| | | |
|---|---|---|
| FR | 1221455 | 6/1960 |
| FR | 1 433 497 | 2/1966 |
| FR | 1433497 | 4/1966 |
| WO | WO 02/055754 | 7/2002 |
| WO | WO 02/055754 A2 | 7/2002 |

* cited by examiner

PROCESS FOR FORMING A PROTECTIVE COATING CONTAINING ALUMINIUM AND ZIRCONIUM ON A METAL

CROSS-REFERENCE TO RELATED APPLICATION

This application claims priority of French Patent Application Number 0304104, filed on Apr. 2, 2003.

TECHNICAL FIELD

The invention relates to a process for forming a protective coating containing aluminium on a metal substrate in which the said substrate and a non-gaseous precursor containing aluminium are placed in contact at a high temperature with an atmosphere containing an active gas which reacts with the precursor to form a gaseous aluminium compound which decomposes on contact with the substrate depositing aluminium metal thereon.

BACKGROUND TO THE INVENTION

Such a process, known by the name of aluminization, or activated cementation, is described in FR 1433497 A. It is used for the manufacture by diffusion of alloy coatings of the Ni—Al type acting as an intermediate layer between the nickel-based superalloy substrate of the hot components of aircraft engines and the barrier providing thermal protection for the substrate, thus making it possible to improve both the bonding of the barrier to the substrate and the capacity of the latter to retain useful properties in the event of deterioration of the thermal barrier.

The known process takes place under static conditions. The substrate and a cement containing the aluminium are placed in a semi-sealed box, this greatly restricting gas exchanges with the external atmosphere. Temperature and pressure are held constant in the course of the treatment. During the process of deposition a quasi-stationary state is established and near equilibrium conditions are obtained between the cement and the gas phase on the one hand and the gas phase and the substrate on the other.

In order to aluminize a nickel-based substrate a chromium-based donor cement is selected in which the activity of Al is greater than in the nickel for the same aluminium concentration.

The coating obtained essentially comprises the β-NiAl phase, which has a simple cubic structure. This phase has a wide range of non-stoichiometry from $NiAl^{(+)}$ (57% by atoms) to $NiAl^{(-)}$ (37% by atoms). This phase is aluminium-forming and does not give rise to predominant diffusion of either Al or Ni.

A cyclical process for the deposition of aluminium which takes place continually until the aluminium activity of the substrate surface becomes the same as that imposed by the cement is established during the course of aluminization.

The process of the aluminization of a substrate breaks down into four stages:
1. formation of a gas phase from the cement, ensuring transport of the aluminium,
2. transport of this gas phase towards the substrate being coated,
3. exchange and reduction reactions at the surface of the substrate with the release of aluminium,
4. solid diffusion of the deposited aluminium into the substrate, tending to reduce its surface activity.

The overall rate of this process with four consecutive stages is governed by the rate of the slowest stage. The process takes place in a semi-sealed enclosure, where gaseous exchanges with the exterior are very restricted. It may be assumed that the rates of the chemical reactions at the gas-solid interfaces are very high in relation to the rates of the diffusion mechanisms. Thus the overall kinetics of this process are governed by the relative magnitude of diffusion in the gas phase and solid diffusion in the coating being formed.

Firstly in order for the entire process to take place it is necessary that the atmosphere in which the deposit is formed should not interact with its mechanisms of formation. This is why the shielding gas will be either neutral (argon) or reducing (hydrogen). Likewise, for transport of the aluminium to take place in the gas phase this element must be present in the atmosphere. This presence is ensured by a molecule called an "activator". Its action is simple: the activator corrodes the donor cement to form a gaseous aluminium halide. The corrosive agent (a halogen acid) is renewed at each exchange reaction on the recipient substrate.

Hence the activator selected must be a gas at the temperature of the coating and must not produce pollutants. For this reason the activators generally used are ammonium chloride $NH_4Cl$, ammonium fluoride $NH_4F$ and ammonium acid fluoride $NH_4,HF$. In the presence of hydrogen or under a neutral gas and at high temperature these molecules decompose according to

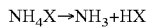
$$NH_4X \rightarrow NH_3 + HX$$

where X represents Cl or F.

The vaporisation temperature depends on the nature of the halogen salt selected. For example it is 340° C. for ammonium chloride. In the known process the activator is only used for completely safe transport of a halogen acid into the reactor in which deposition is to be carried out, that is the semi-sealed box. The cation associated with this halogen (in this case ammonium) as a consequence serves no purpose.

Furthermore, various research work has shown the favourable effect of zirconium on the bonding of a layer of oxide to a metal substrate, whether this layer is formed by exposure to air at high temperature or by the deposition of a thermal barrier. However no process which can be used industrially has been suggested for inserting this element into a protective coating containing aluminium.

The object of the invention is to amend the known process described above for this purpose.

SUMMARY OF THE INVENTION

The invention relates in particular to a process of the type described in the introduction, and provides that the said atmosphere contains a gaseous compound of a modifier metal which decomposes on contact with the substrate and deposits the modifier metal thereon, simultaneously with the deposition of aluminium.

Optional complementary or substitutable features of the invention are listed below:

- The said modifier metal is selected from zirconium, hafnium and yttrium.
- The said active gas at least in part comprises the said gaseous compound.
- The said active gas comprises solely the said gaseous compound.
- The said active gas also contains at least one ammonium compound.

The said active gas and/or the said gaseous compound are formed by the vaporisation of at least one solid substance at ambient temperature mixed with the said precursor.

The substrate contains at least one element which combines with the aluminium to form an intermetallic compound within the coating in which aluminium is partly substituted by the modifying metal.

The said substrate element is nickel and the said intermetallic compound is β-NiAl.

The substrate is a nickel-based superalloy.

The said active gas and/or the said gaseous compound contain at least one halogen.

The said gaseous compound is at least one compound selected from $ZrCl_4$, $ZrOCl_2$ and $(NH_4)_2ZrF_6$.

The said active gas contains at least one compound selected from $NH_4Cl$, $NH_4F$ and $NH_4F,HF$.

The said precursor is an alloy of aluminium and chromium.

The substrate and the precursor are at a distance from each other.

The substrate is located above the precursor.

The substrate and the precursor are placed in an enclosure which only permits limited exchanges with the exterior.

In addition to the active gas and the gaseous compound the said atmosphere is formed of an inert or reducing gas and preferably hydrogen.

The modifier element is present in the said protective coating in a concentration by mass of less than 0.5%.

The said concentration by mass lies between 500 and 1000 ppm and is preferably approximately 800 ppm.

The said high temperature lies between 950 and 1200° C. and is preferably approximately 1080° C.

The features and advantages of the invention will be described in greater detail in the description below with reference to the appended drawings.

DESCRIPTION OF PREFERRED EMBODIMENT

Figure 1:
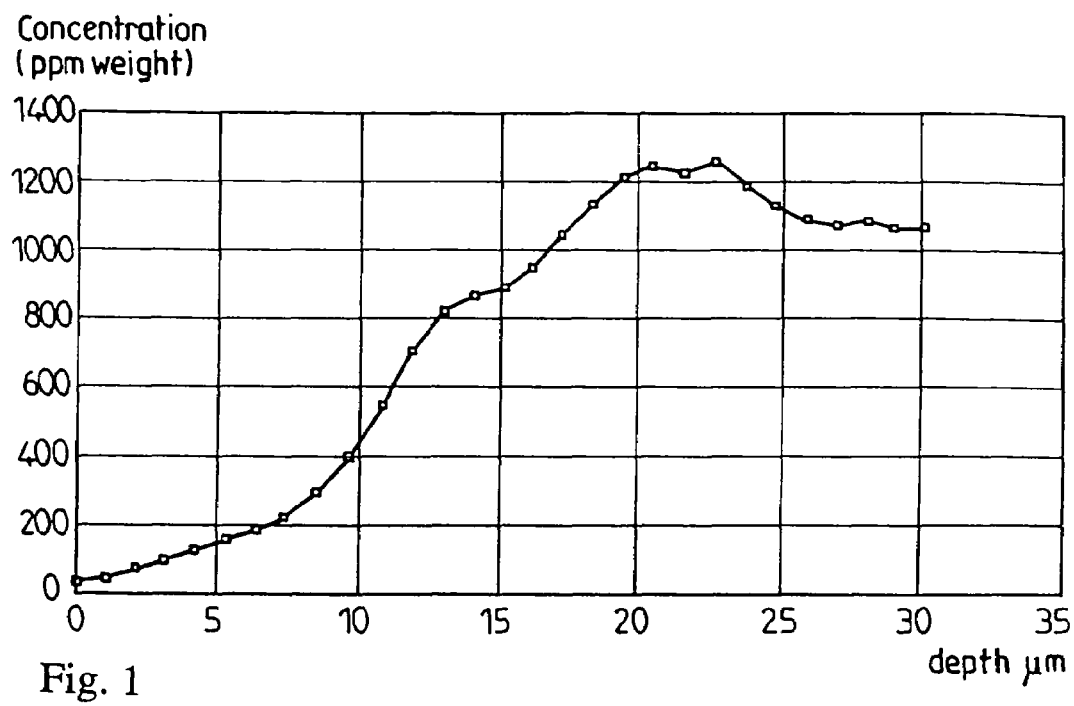
FIGS. 1 and 2 are graphs showing the distribution of zirconium in coatings obtained by the process according to the invention.

In the process according to the invention the aluminium halide of the known process is at least partly replaced by a compound of the element which it is desired to see present in the deposit in trace quantities, in particular a zirconium compound.

The zirconium salts which are capable of acting as an activator include zirconium chloride $ZrCl_4$, zirconium oxychloride $ZrOCl_2$ and ammonium fluorozirconate $(NH_4)_2ZrF_6$, this list not being restrictive. All these salts have the advantage of being gases above 250° C. For reasons of convenience and safety it is advantageous to use zirconium oxychloride.

The principle of deposition is identical to that in the previous process: a semi-sealed box of nickel-chromium alloy or refractory steel of the NCD 16 type contains a cement in the form of coarse granules having a grain diameter of between 1 millimetre and several centimetres. The parts which are to be coated are suspended a few centimetres above the cement in such a way as to be immersed in the flow of gaseous aluminium halide. According to the invention the aluminium halide is replaced either wholly or in part by zirconium oxychloride. Through evaporating, the latter leads to the formation of a vapour rich in zirconium chloride which engages in an exchange reaction at the surface of the nickel-based superalloy substrate to form metallic zirconium and a halogen acid which is available to form an aluminium halide in the donor cement. The zirconium deposited at the surface of the substrate then diffuses into the forming β-NiAl coating to ultimately yield an intermetallic compound enriched with between 500 and 1000 ppm of zirconium.

As a variant the parts which are to be coated are in contact with the cement, such as for example in accordance with the box cementation technique in which the parts are immersed in the cement powder.

This general principle is illustrated by the examples which follow, although the latter are not in any way restrictive.

COMPARATIVE EXAMPLE

This example illustrates the prior art. An aluminium donor cement comprising a chromium-aluminium allow in the proportions by mass of 70% of chromium to 30% of aluminium is placed in a semi-sealed box. 10 g of ammonium acid fluoride $NH_4F,HF$ as activator is added per 1000 g of cement (1% by mass). The parts requiring treatment are placed above the cement+activator mixture. After 6 hours treatment at 1080° C. under hydrogen a stoichiometric β-NiAl coating is formed. This coating has a thickness of approximately 50 μm. It has the conventional microstructure—a single phase layer of β-NiAl, which is approximately 40 μm thick, lies above an interdiffusion zone approximately 10 μm thick in which TCP phases which are rich in elements which are insoluble or poorly soluble in the β phase are present. The appearance of these phases is due to the diffusion of nickel into the coating.

EXAMPLE 1

The procedure was as in the comparative example replacing the ammonium acid fluoride by an equivalent quantity (mole for mole) of zirconium oxychloride. On completion of the treatment a coating having a thickness of approximately 50 μm was obtained. However, contrary to the previous instance, this deposit had three distinct zones. In the substrate, the interdiffusion zone, approximately 10 μm thick, was conventional. This zone was overlain by a single-phase β-NiAl coating approximately 40 μm thick. Finally an additional zone approximately 10 μm thick consisted of a matrix of β-NiAl containing precipitates of chromium-zirconium. Analysis of the concentration profile over a thickness of 20 μm by mass spectroscopy (glow discharge mass spectroscopy, GDMS) showed that the zirconium is concentrated in the first few micrometres and that its concentration in the rest of the coating was approximately 200 parts per million (ppm) by mass.

EXAMPLE 2

The procedure was as in example 1, replacing the aluminium-chromium donor cement containing 30% aluminium with a chromium-based cement containing 20% of aluminium. The purpose of this reduction in the activity of the aluminium was to enhance better distribution of the zirconium throughout the coating. As in the previous example the treatment temperature was 1080° C. and the working atmosphere was hydrogen. However, in order to compensate for the low activity of the aluminium the treatment time was extended to 16 hours. On completion of this treatment a coating of approximately 50 μm was obtained. This coating consisted of two parts—an interdiffusion zone of approximately 10 μm containing the conventional TCP phases and a coating proper having a thickness of approximately 40 μm and comprising a matrix of stoichiometric β-NiAl containing zirconium in solid solution and free from precipitate. GDMS analysis yielded the zirconium concentration profile as shown in FIG. 1 (concentration by mass in ppm as a function of depth in μm).

This analysis confirms the hypothesis that the zirconium is first deposited on the surface of the substrate being coated and then diffuses in the solid state through the forming layer of nickel aluminide.

EXAMPLE 3

Figure 2:
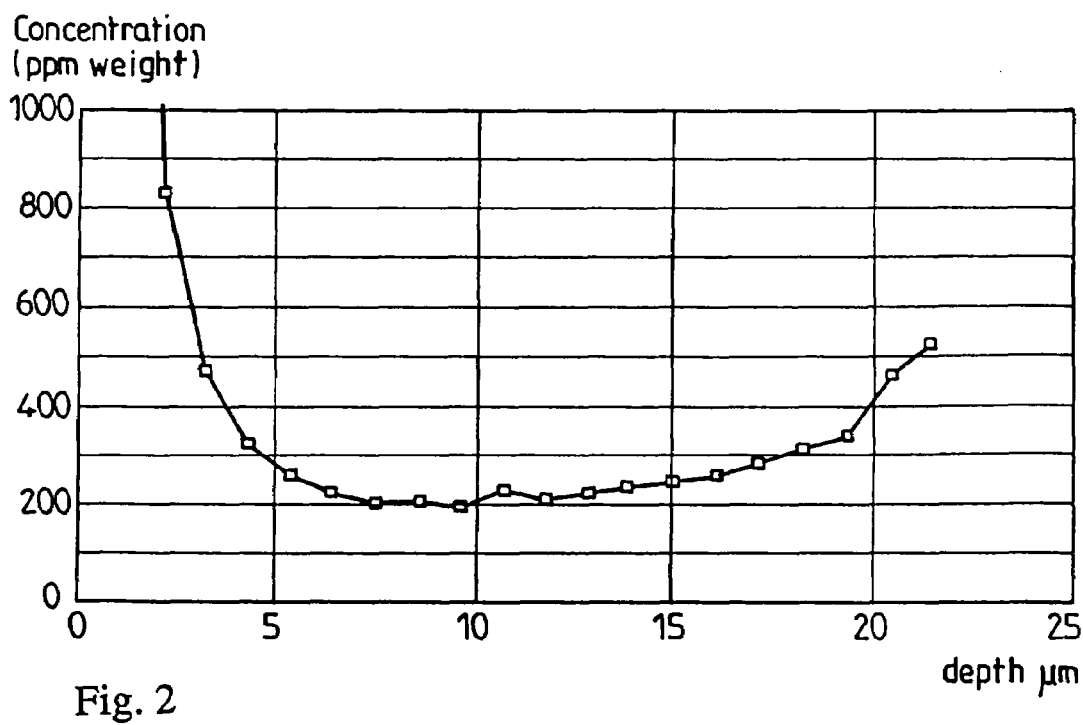

In this example it is the intention to demonstrate that it is possible to control the zirconium concentration obtained in the coating through mere dilution of the quantity of Zr-based activator. To effect this the procedure was as in the comparative example, replacing only part of the ammonium acid fluoride (the activator) by zirconium oxychloride. In this case the $ZrOCl_2/NH_4F,HF$ molar ratio was 1/9. Here also a nickel aluminide coating was obtained with a thickness of approximately 50 μm with an interdiffusion layer of approximately 10 μm and a layer of stoichiometric β-NiAl 40 μm thick. GDMS analysis over a depth of 20 μm showed that the average zirconium content was less than in the previous example. Furthermore as the donor cement was different (higher activity), the concentration profile obtained was also different, as shown in FIG. 2.

The invention claimed is:

1. Process for forming a protective coating containing aluminium on the surface of a nickel-based superalloy in which the nickel-based superalloy and a non-gaseous precursor containing aluminium are placed in contact, at a treatment temperature sufficient for stoichiometric coating, with a reducing or inert atmosphere containing an active gas which reacts with the precursor to form a gaseous aluminium compound which decomposes on contact with the nickel-based superalloy depositing aluminium metal thereon, characterised in that the reducing or inert atmosphere contains a gaseous compound of a modifier metal which decomposes on contact with the nickel-based superalloy and deposits the modifier metal thereon simultaneously with the deposition of aluminium, wherein the gaseous compound of the modifier metal is zirconium oxychloride such that zirconium metal is deposited simultaneously with the deposition of aluminum.

2. Process according to claim 1, in which the active gas at least in part comprises the gaseous compound.

3. Process according to claim 2, in which the active gas solely comprises the gaseous compound.

4. Process according to claim 2, in which the active gas also contains at least one ammonium compound.

5. Process according to claim 1, in which the active gas and/or the gaseous compound are formed by the vaporisation of at least one substance which is solid at ambient temperature mixed with the precursor.

6. Process according to claim 1, in which the nickel-based superalloy contains at least one element which combines with the aluminium to form an intermetallic compound within the coating in which the aluminium is partly substituted by the modifier metal.

7. Process according to claim 6, in which the element of the substrate is nickel and the intermetallic compound is β-NiAl.

8. Process according to claim 1, in which the active gas contains at least one compound selected from $NH_4Cl$, $NH_4F$ and $NH_4F$, HF.

9. Process according to claim 1, in which the precursor is an alloy of aluminium and chromium.

10. Process according to claim 1, in which the substrate and the precursor are at a distance from each other.

11. Process according to claim 10, in which the substrate is located above the precursor.

12. Process according to claim 1, in which the substrate and the precursor are in contact.

13. Process according to claim 1, in which the substrate and the precursor are located in an enclosure permitting only limited exchanges with the exterior.

14. Process according to claim 1, in which in addition to the active gas and the gaseous compound, the reducing or inert atmosphere comprises reducing gas.

15. Process according to claim 14, in which the active gas contains at least one compound selected from $NH_4Cl$, $NH_4F$ and $NH_4F$, HF.

16. Process according to claim 1, in which the modifier metal is present in the protective coating in a concentration by mass of less than 0.5%.

17. Process according to claim 16, in which the concentration by mass lies at or above 500 ppm and below 1000 ppm.

18. Process according to claim 1, in which the treatment temperature is about 1080° C.

19. A method for forming a protective coating containing aluminium on a surface of a nickel-based superalloy, the method comprising:
   placing the nickel-based superalloy and a non-gaseous precursor containing aluminium in contact, at a treatment temperature sufficient for stoichiometric coating, with a reducing or inert atmosphere containing an active gas;
   reacting the reducing or inert atmosphere containing the active gas with the non-gaseous precursor containing aluminium to form a gaseous aluminium compound;
   decomposing the gaseous aluminum compound on contact with the nickel-based superalloy and depositing aluminium metal on the nickel-based superalloy, wherein the reducing or inert atmosphere further comprises a gaseous compound of a modifier metal; and
   decomposing the gaseous compound of the modifier metal on contact with the nickel-based superalloy and simultaneously depositing the modifier metal on the nickel-based superalloy with the depositing of the aluminium metal, wherein the gaseous compound of the modifier metal is zirconium oxychloride such that zirconium metal is deposited simultaneously with the depositing of the aluminum metal.

20. The method of claim 19, wherein the active gas consists of the gaseous compound of the modifier metal.

21. Process according to claim 19, in which the active gas at least in part comprises the gaseous compound.

* * * * *